United States Patent
Segal et al.

(10) Patent No.: US 10,520,681 B2
(45) Date of Patent: Dec. 31, 2019

(54) METHOD, APPARATUS AND SYSTEM FOR ALIGNING OPTICAL TRANSPORTS IN A FERRULE

(71) Applicant: Wave2Wave Solution Inc., Fremont, CA (US)

(72) Inventors: Amnon Segal, Tel Mond (IL); Xuezhe Zheng, San Diego, CA (US); Yonatan Silberman, Shoham (IL); Weimin Wang, Reno, NV (US)

(73) Assignee: WAVE2WAVE SOLUTION INC., Fremont, CA (US)

( * ) Notice: Subject to any disclaimer, the term of this patent is extended or adjusted under 35 U.S.C. 154(b) by 0 days.

(21) Appl. No.: 15/915,347

(22) Filed: Mar. 8, 2018

(65) Prior Publication Data
US 2019/0278030 A1 Sep. 12, 2019

(51) Int. Cl.
*G02B 6/38* (2006.01)

(52) U.S. Cl.
CPC ......... *G02B 6/3855* (2013.01); *G02B 6/3863* (2013.01); *G02B 6/3885* (2013.01)

(58) Field of Classification Search
CPC ... G02B 6/3855; G02B 6/3885; G02B 6/3863
See application file for complete search history.

(56) References Cited

U.S. PATENT DOCUMENTS

| | | | | | |
|---|---|---|---|---|---|
| 4,496,213 A | * | 1/1985 | Borsuk | ................ | G02B 6/3825 385/59 |
| 4,986,762 A | * | 1/1991 | Keith | ................... | G02B 6/3823 385/76 |
| 6,527,452 B1 | * | 3/2003 | Sejourne | ............... | G02B 6/3821 385/134 |
| 6,848,834 B1 | * | 2/2005 | Roehrs | ................... | G02B 6/383 385/59 |
| 7,572,063 B2 | * | 8/2009 | Mynott | ................ | G02B 6/3817 385/56 |
| 7,874,740 B2 | * | 1/2011 | Hoffmann | ............ | G02B 6/3879 385/139 |
| 8,834,037 B2 | * | 9/2014 | Wouters | ................ | G02B 6/383 385/71 |
| 2009/0047800 A1 | * | 2/2009 | Tabet | ................... | G02B 6/3897 439/32 |

\* cited by examiner

*Primary Examiner* — Ellen E Kim
(74) *Attorney, Agent, or Firm* — Pearl Cohen Zedek Latzer Baratz LLP

(57) ABSTRACT

A pair of optical ferrules is disclosed. Each of a first ferrule and a second ferrule of the pair may include at least one protrusion and at least one recess. Each of the protrusions or recesses may have at least one channel for holding an optical fiber. Upon mating the two ferrules, the protrusion of the first ferrule is configured to be inserted into the recess of the second ferrule and the protrusion of the second ferrule is configured to be inserted into the recess of the first ferrule such that the optical fibers held in each protrusion are optically aligned to be connected face to face with the optical fibers held in the corresponding recess of the other ferrule.

19 Claims, 7 Drawing Sheets

METHOD, APPARATUS AND SYSTEM FOR ALIGNING OPTICAL TRANSPORTS IN A FERRULE

BACKGROUND OF THE INVENTION

Optical fiber connectors are an essential part of substantially any optical fiber communication system. For instance, such connectors are used to join segments of fibers together, in order to connect a fiber to active devices, such as radiation sources, detectors and repeaters, and to passive devices, such as switches, multiplexers and attenuators A typical optical fiber connector includes a housing and a ferrule assembly within the housing. The ferrule assembly includes a ferrule, which has one or more fiber channels to accommodate fibers, and a fiber secured in each channel such that the end of the fiber is exposed for optical coupling by the ferrule. The housing is designed to engage in a "mating structure" having an optical path at which the fibers optically coupled during mating.

Prior art mechanical transfer (MT) connectors include a substantially rectilinear body having a front mating surface and a parallel rear surface, as shown in FIG. 1.

An MT ferrule 100 is generally used for multi-fiber applications and has a substantially rectangular shape in lateral cross-section. It includes two ferrules, 100a and 100b and has a row 106 of fiber channels in a single plane. Ferrule 100a includes two holes 104a and 104b, ferrule 100b includes two pins 102a and 102b, Me required alignment is typically achieved in MT-type connectors by mounting two pins 102a, 102b in holes 104a and 104b of one of the ferrules, such that, each pin is held in place by a pin holder. After this assembly operation, ferrule 100a becomes a female ferrule, and ferrule 100b becomes a male ferrule. When male ferrule 100b and female ferrule 100a mate, the pins 102a and 102b from the male ferrule 100b penetrate into holes 104a and 104b of the female ferrules 100a, and thus the desired alignment is achieved.

The aim of alignment pins 102a, 102b is to position the two ferrules 100a and 100b in such a way that fibers (not shown) from ferrule 100a are aligned with the corresponding fibers in the ferrule 100b, so as to permit full light transfer from one ferrule to the other ("optical alignment").

The current multi-fiber ferrule manufacturing limitations requires the following:
 a. all fibers must reside on same plane; and
 b. fiber core to core alignment (CCA) lateral and angular correction done by pins, requires the use of pines having much larger diameters than the fibers, and thus consumes much of the ferrule space.

SUMMARY OF THE INVENTION

According to some embodiments of the presentation, there is provided a mated pair of optical ferrules. The mated pair of optical ferrules may include a first ferrule and a second ferrule, of which the first ferrule may include at least one protrusion having at least one fiber channel for holding an optical fiber, and at least one recess, having at least one fiber channel for holding optical fibers; and of which the second ferrule may include at least one protrusion having at least one fiber channel for holding an optical fiber, and at least one recess having at least one fiber channel for holding an optical fiber. Upon mating the two ferrules, the protrusion of the first ferrule may be configured to be inserted into the recess of the second ferrule such that the optical fiber held in the protrusion is optically aligned to be connected face to face with the optical fiber held in the recess of the second ferrule, and the protrusion of the second ferrule may be configured to be inserted into the recess of the first ferrule such that the optical fiber held in the protrusion of the second ferrule is optically aligned to be connected face to face with the optical fiber held in the recess of the first ferrule.

In another embodiment of the present invention, there is provided an optical ferrule. The optical ferrule may include at least one protrusion having one or more fiber channels for holding optical fibers, and at least one recess having one or more fiber channels for holding optical fibers. Upon mating two optical ferrules, the protrusion of the first of the two optical ferrules may be configured to be inserted into the recess of the second of the two optical ferrules, such that the optical fibers held in the protrusion are optically aligned to be connected face to face with the optical fibers held in the recess, and the protrusion of the second of the two optical ferrules may be configured to be inserted into the recess of the first of the two optical ferrules, such that the optical fibers held in the protrusion are optically aligned to be connected face to face with the optical fibers held in the recess.

BRIEF DESCRIPTION OF THE DRAWINGS

The subject matter regarded as the invention is described in detail and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The present invention provides optical ferrules, which overcome many of the drawbacks of the prior art ferrules. The density of optical fibers accommodated in an optical connector is significantly increased, the ferrules may be shaped in any structural form and the optical fibers do not reside on a single plane. The ferrules may be used in physical contact manner (physical contact between ferrules of different connectors) or using a micro lens, where at least one micro lens is placed in each optical ferrule face to allow collimated beam to travel from one core to the other.

Figure 1:
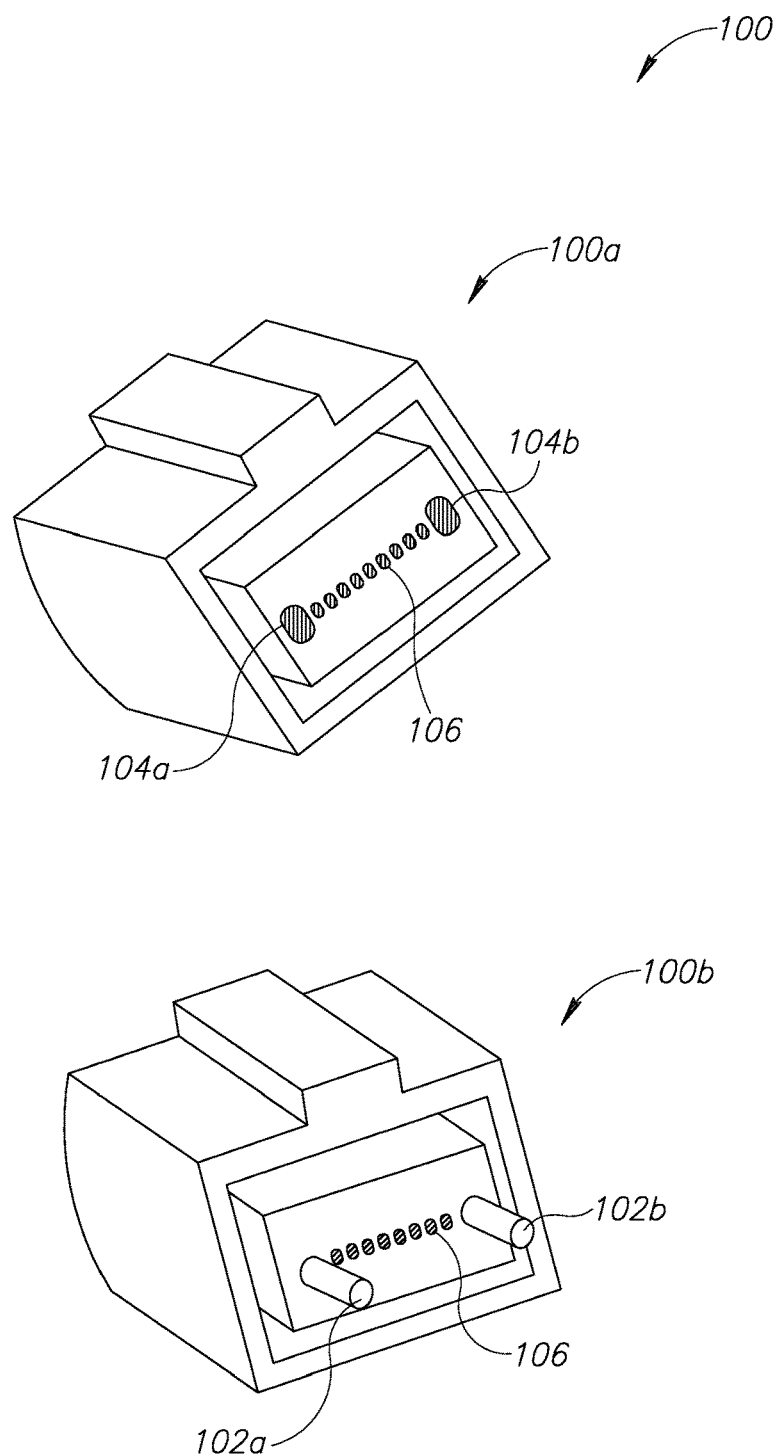
FIG. 1 shows a view of a mated pair of prior art MT-type ferrules.
Figure 2A:
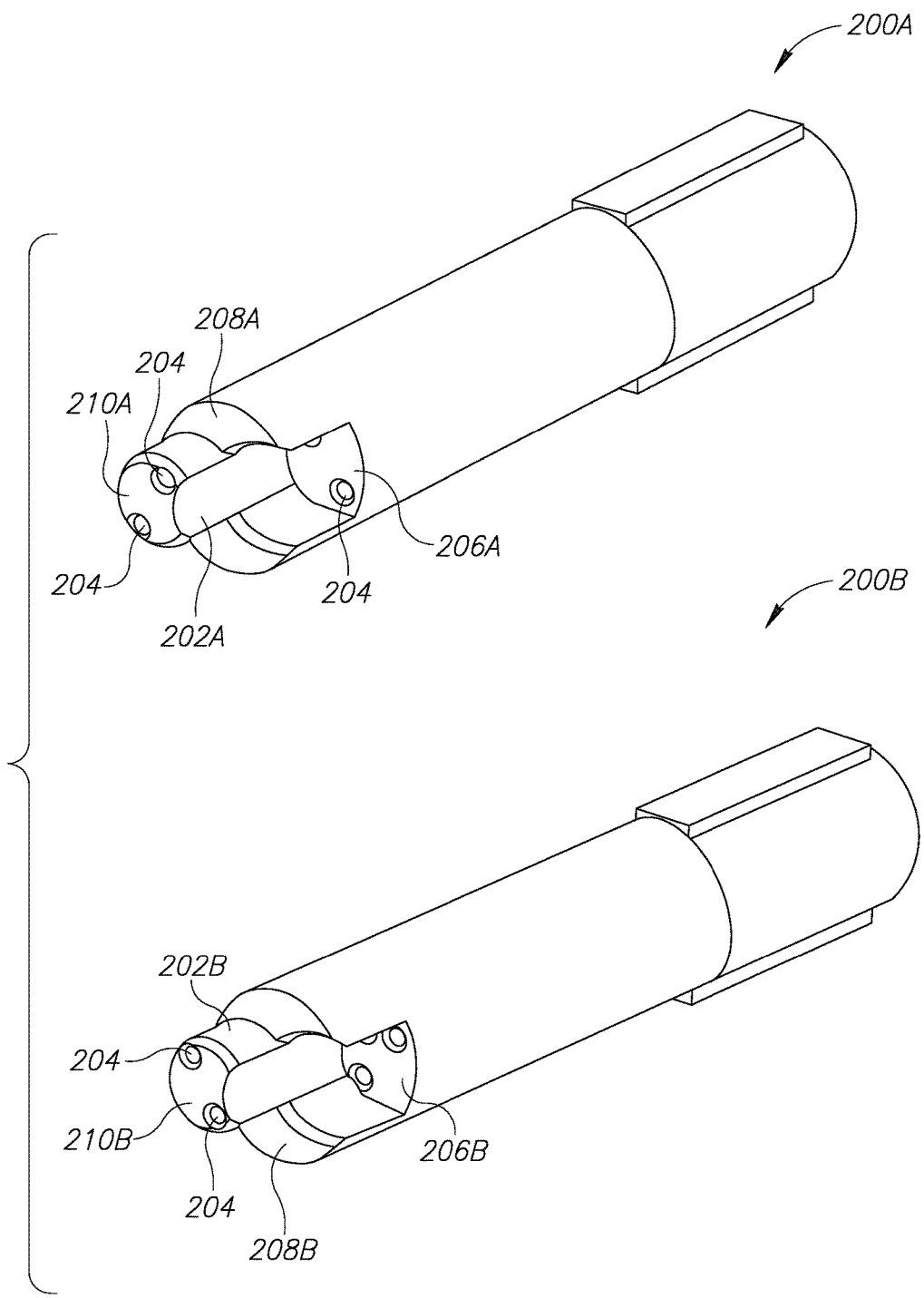
FIGS. 2A and 2B are perspective views of a mated pair of optical ferrules according to an embodiment of the present invention.
Figure 2B:
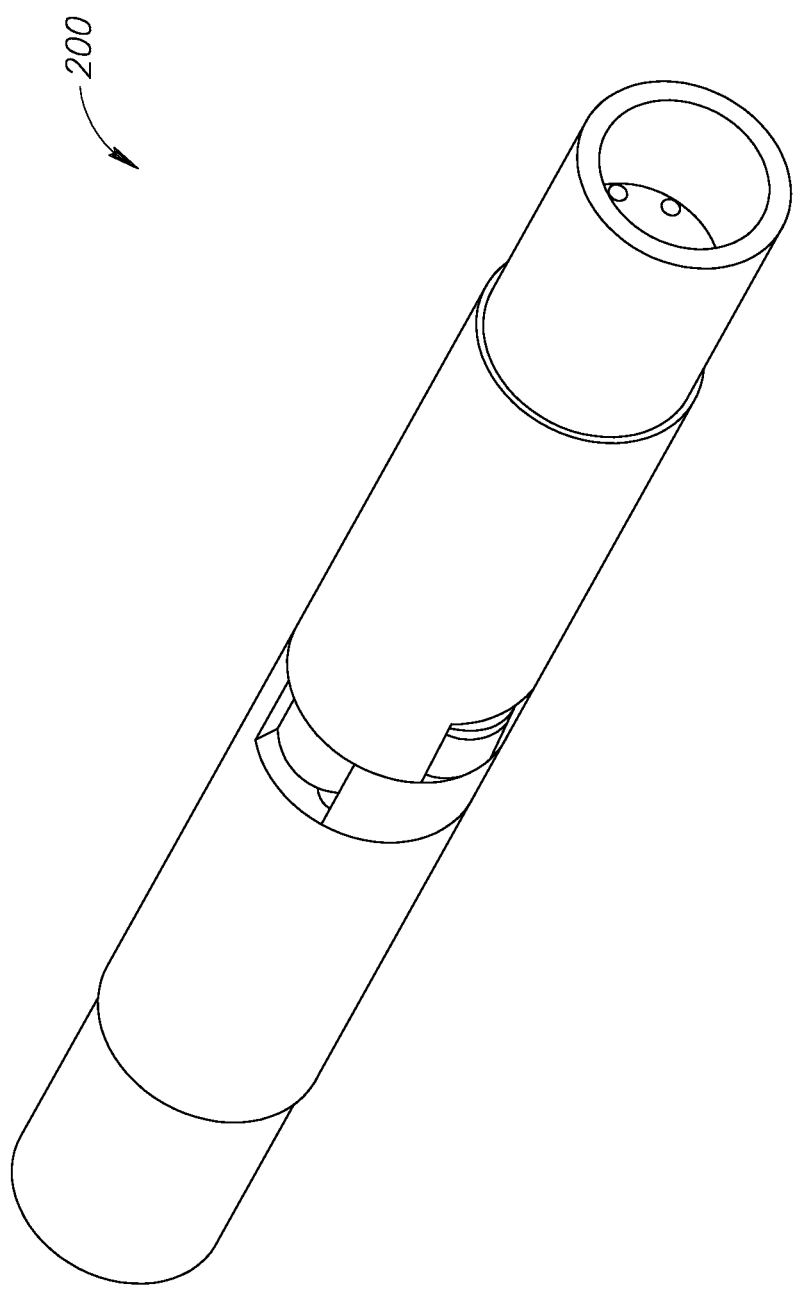

Referring to FIG. 2A, which is a representative view of a four-fiber channels mated pair of optical ferrules, each having a cylindrical shape, according to some embodiments of the present invention. A mate pair 200 may include a first optical ferrule 200A and a second optical ferrule 200B. The two ferrules may be asymmetric, such that first ferrule 200A may include a protrusion 202A and a recess 206A, and second ferrule 200B may include a protrusion 202B and a recess 206B. Each one of the protrusions 202A, 202B and each one of the recesses 206A, 206B may have two fiber channels 204 for holding a total of four optical fibers upon mating of two ferrules 200A and 200B (see FIG. 2B for illustration). In some embodiments, upon mating, protrusion 202A may be inserted into recess 206B, and protrusion 202B may be inserted into the recess 206A. Accordingly, the optical fibers (not shown) held in the protrusion 202A are optically aligned and connected face to face with the optical fibers (not shown) held in the recess 206B, and the optical fibers (not shown) held in protrusion 202B are optically aligned when connected face to face with the optical fibers (not shown) held in the recess 206A.

According to some embodiments of the present invention, a surface 210A of the protrusion 202A may be parallel to a surface 208A of the recess 206A.

According to some embodiments of the present invention, a surface 210B of the protrusion 202B may be parallel to a surface 208B of recess 206B.

According to some embodiments of the present invention, the structure of the optical ferrules may be of any shape, such as rectangular, cylindrical, oval, any polygon based and the like.

According to some embodiments of the present invention, the optical ferrule may be symmetric. In such an embodiment, the two ferrules to be mated may be identical.

Figure 3:
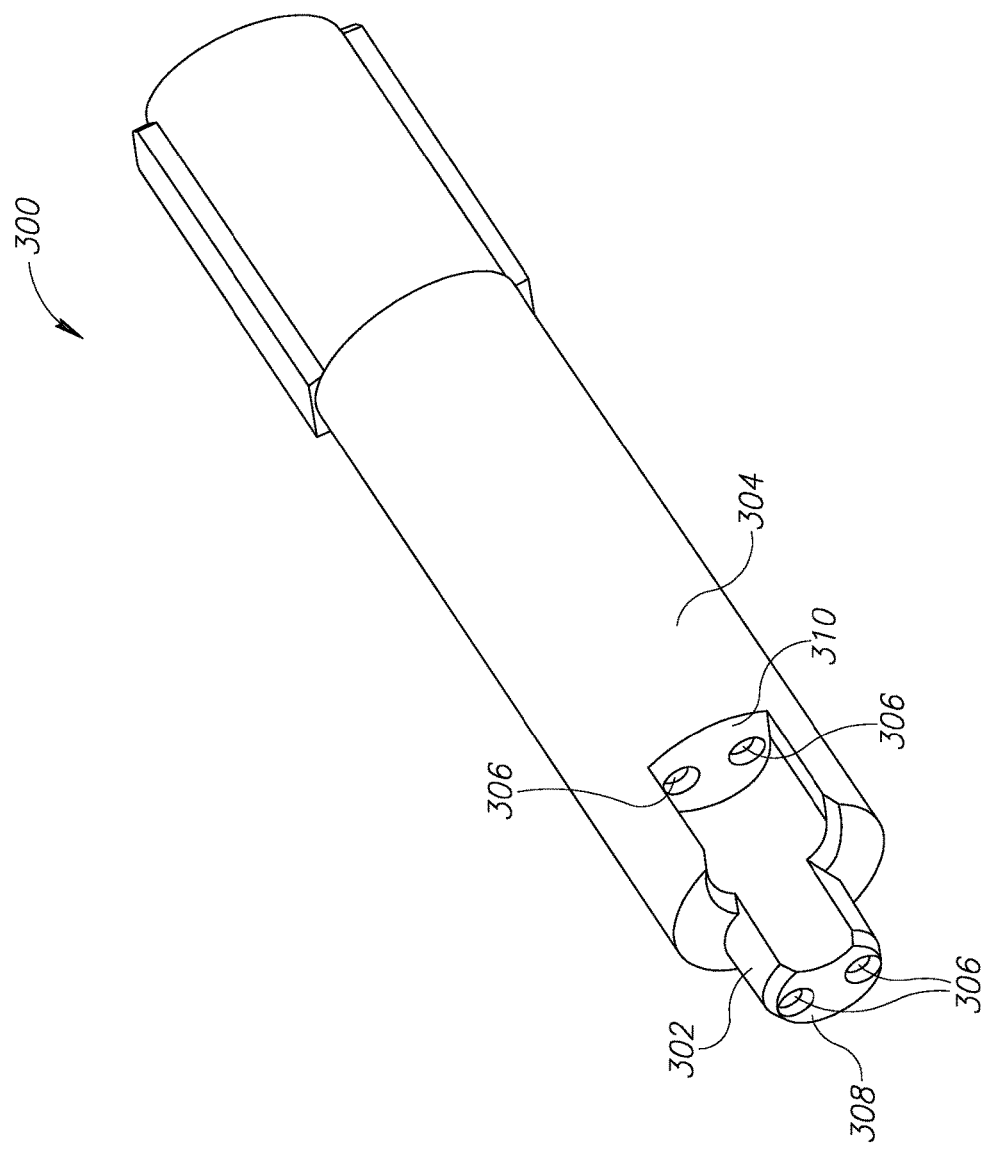
FIG. 3 is a perspective view of an optical ferrule according to an embodiment of the present invention.

Referring to FIG. 3, which is an illustration of a four-fiber channel symmetric optical ferrule of a cylindrical shape, according to some embodiments of the present invention. An optical ferrule 300 may include a protrusion 302 and a recess 310. The protrusion 302 and the recess 310 may have two fiber channels 306 for holding a total of four optical fibers (not shown). Upon mating two optical ferrules 300, the protrusion 302 may be inserted into the recess 310 such that the optical fibers held in the protrusion 302 may be optically aligned with the optical fibers held in the recess 310.

According to some embodiments of the present invention, the number of fiber channels included in each recess/protrusion may be more than one, for example, 2, 3, 4, 6, 8 and more.

Figure 4:
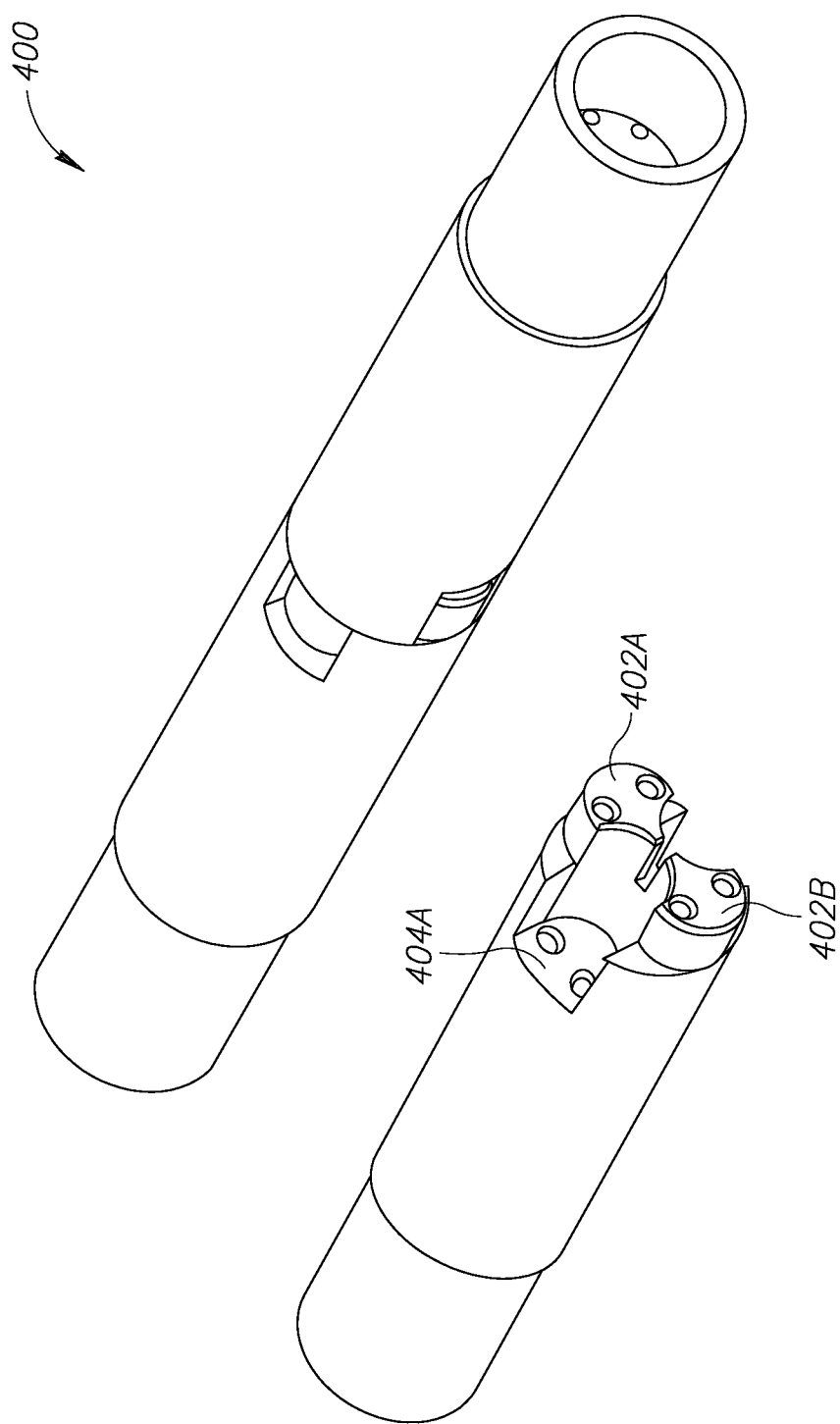
FIG. 4 is a perspective view of a mated pair of optical ferrules according to another embodiment of the present invention.

Referring to FIG. 4, which is an illustration of an eight-fiber channels optical ferrule 400 according to some embodiments of the present invention. Optical ferrule 400 may include two protrusions 402A and 402B and two recesses 404A and 404B (recess 404B is not shown, a sit is hidden by two protrusions 402A and 402B due to the perspective view). Each recess/protrusion may have two fiber channels, enabling a total number of eight fiber optics to be held.

According to some embodiments, a two-dimensional optical ferrule (2D ferrule) that may have flat end face with multiple fibers may be manufactured and may be transformed into a three-dimensional (3D) ferrule, by sliding the recesses such that the surface of the recesses may be justified with the surface of the protrusions. In some embodiments, such a 2D optical ferrule may easily enable the procedure of polishing of the fiber optics held in the fiber channels.

According to some embodiments, sliding of the recesses may be done by decompressing springs supported by the recesses.

According to some embodiments, sliding of the recesses may be conducted by a mechanical guide supported by the recesses.

Figure 5:
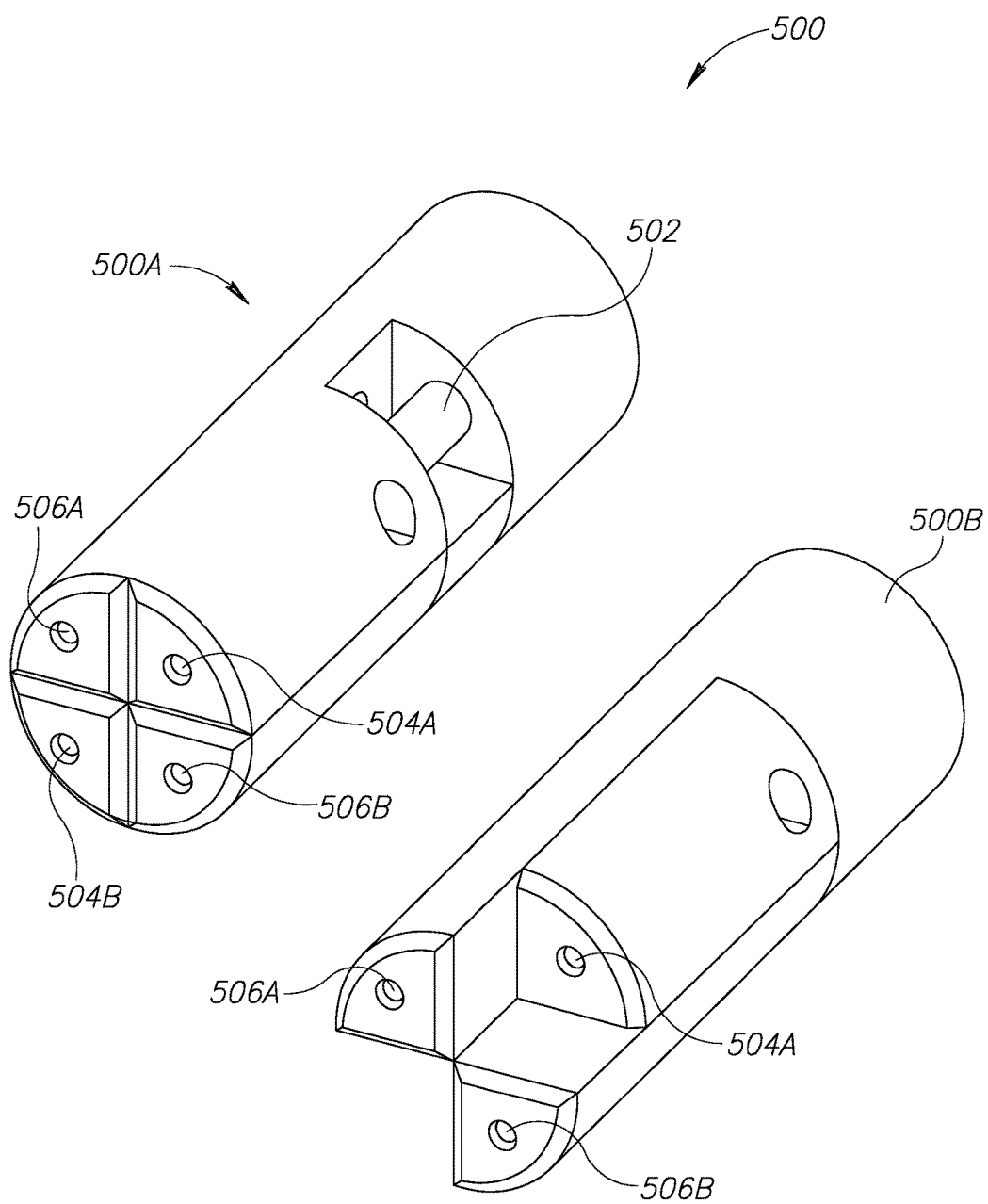
FIG. 5 is a perspective view of two dimensional (2D) optical ferrule turned into a three dimensional (3D) optical ferrule.

Reference is now made to FIG. 5, which is an illustration of a 2D four-channel optical ferrule 500A according to some embodiments of the invention. Optical ferrule 500A may include two recesses 504A, 504B and two protrusions 506A, 506B. In some embodiments, optical ferrule 500A may be transformed to a 3D four-channel optical ferrule 500B according to an exemplary embodiment of the present invention, by sliding the recess 504A using a first mechanical guide 502 and by sliding recess 504B using a second mechanical guide (not shown).

In some embodiments, the ferrules may be made of any suitable material, for example, nickel alloy, stainless steel, other metals, plastics, glasses, ceramics, such as, zirconia and the like.

In some embodiments, the ferrules may be used in any optical connector that meant for human handling or, optical connector that is being used in automatic systems such as robotic optical cross connect switch.

Figure 6:
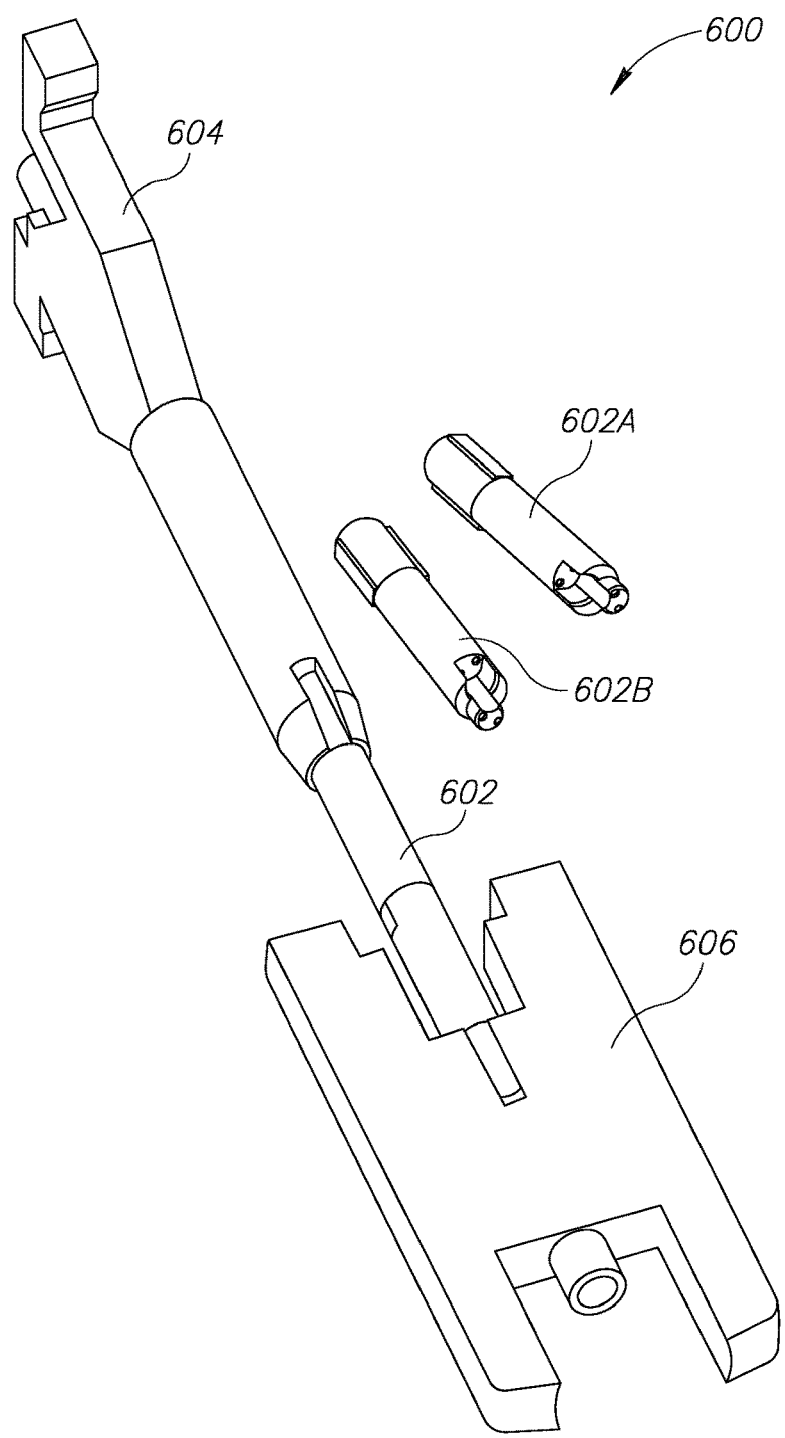
FIG. 6 illustrates a mating view of optical ferrules used in a robotic optical cross connect switch according to an embodiment of the present invention

Reference is made to FIG. 6, which is an illustration of an assembly 600 that includes optical ferrules to be used in a robotic optical cross connect switch according to some embodiments of the present invention. The assembly 600 may include a mated pair of optical ferrules 602, a male flange 604 and a female flange 606. The mating pair 602 may include a first optical ferrule 602A and a second optical ferrule 602B. The optical ferrules may be of any of the optical ferrules discloses herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A mated pair of optical ferrules, comprising:
a first ferrule comprising:
at least a first protrusion having at least one fiber channel for holding a first optical fiber; and
at least a first recess having at least one fiber channel for holding a second optical fiber, wherein the at least first recess is slidable with respect to the at least first protrusion such that the surface of the at least first recess may be justified with the surface of the at least one first protrusion; and
a second ferrule comprising:
at least a second protrusion having at least one fiber channel for holding a third optical fiber; and
at least a second recess having at least one fiber channel for holding a fourth optical fiber, wherein the at least second recess is slidable with respect to the at least second protrusion such that the surface of the at least second recess may be justified with the surface of the at least second protrusion,
wherein the first and second ferrules are configured to be mated such that:
the at least first protrusion is configured to be inserted into the at least second recess, such that the first optical fiber held in the at least first protrusion is optically aligned to be connected face to face with the fourth optical fiber held in the at least second recess, and
the at least second protrusion is configured to be inserted into the at least first recess such that the third optical fiber held in the at least second protrusion is optically aligned to be connected face to face with the second optical fiber held in the at least first recess.

2. The mated pair of optical ferrules according to claim 1, wherein ends of the first and third optical fibers held in the at least first and at least second protrusions, respectively, are justified with surfaces of the at least first and at least second protrusions, respectively.

3. The mated pair of optical ferrules according to claim 1, wherein ends of the second and fourth optical fibers held in the at least first and at least second recesses, respectively, are justified with surfaces of the at least first and at least second recesses, respectively.

4. The mated pair of optical ferrules according to claim 2, wherein the surface of the at least first protrusion is parallel to the surface of the at least first recess.

5. The mated pair of optical ferrules according to claim 3, wherein the surface of the at least first protrusion is parallel to the surface of the at least first recess.

6. The mated pair of optical ferrules according to claim 2, wherein the surface of the at least second protrusion is parallel to the surface of the at least second recess.

7. The mated pair of optical ferrules according to claim 3, wherein the surface of the at least second protrusion is parallel to the surface of the at least second recess.

8. The mated pair of optical ferrules according to claim 1, wherein both the at least first ferrule and the at least second ferrule are of cylindrical structure.

9. The mated of optical ferrules according to claim 1, wherein both the at least first ferrule and the at least second ferrule are of rectangular structure.

10. An optical ferrule, comprising:
at least one protrusion having one or more fiber channels for holding optical fibers; and
at least one recess having one or more fiber channels for holding optical fibers, wherein the at least one recess is slidable with respect to the at least one protrusion, such that the surface of the at least one recess may be justified with the surface of the at least one protrusion and wherein, said optical ferrule is a first optical ferrule that is configured to be mated with a second optical ferrule with an identical structure such that:
the at least one protrusion of the first optical ferrule is configured to be inserted into the at least one recess of the second optical ferrule such that the one or more optical fibers held in the at least one protrusion of the first optical ferrule are optically aligned to be connected face to face with the one or more optical fibers held in the at least one recess of the second optical ferrule, and
the at least one protrusion of the second optical ferrule is configured to be inserted into the at least one recess of the first optical ferrule such that the one or more optical fibers held in the at least one protrusion of the second optical ferrule are optically aligned to be connected face to face with the one or more optical fibers held in the at least one recess of the first optical ferrule.

11. The optical ferrule according to claim 10, wherein the surface of the at least one protrusion is parallel to the surface of the at least one recess.

12. The optical ferrule according to claim 10, wherein the optical ferrule is of cylindrical structure.

13. The optical ferrule according to claim 10, wherein the optical ferrule is of rectangular structure.

14. A method of manufacturing a mated pair of optical ferrules, the method comprising the steps of:
providing a mated pair of ferrules according to claim 1,
sliding the at least first recess such that the surface of the at least first recess is justified with the surface of the at least first protrusion;
polishing together the optical fibers held in the least first protrusion and at the least first recess;
sliding the at least second recess such that the surface of the at least second recess is justified with the surface of the at least second protrusion; and,
polishing together the optical fibers held in the least second protrusion and at the least second recess.

15. The method according to claim 14, wherein sliding the at least first recess comprises decompressing at least a first spring supporting the at least first recess, and wherein sliding the at least second recess comprises decompressing at least a second spring supporting the at least second recess.

16. The method according to claim 14, wherein sliding the at least first recess comprises using at least a first mechanical guide supporting the at least first recess, and wherein sliding the at least second recess comprises using at least a second mechanical guide supporting the at least second recess.

17. A method of manufacturing an optical ferrule, the method comprising the steps of:
providing an optical ferrule according to claim 10,
sliding the at least one recess such that the surface of the at least one protrusion is justified with the surface of the at least one recess; and,
polishing together the optical fibers held in the least one protrusion and at the least one recess.

18. The method according to claim 17, wherein sliding comprises decompressing at least one spring supporting the at least one recess.

19. The method according to claim 17, wherein sliding comprises using at least one mechanical guide supporting the at least one recess.

* * * * *